(12) United States Patent
Haase et al.

(10) Patent No.: US 9,482,827 B2
(45) Date of Patent: Nov. 1, 2016

(54) OPTICAL CONNECTOR

(71) Applicant: 3M INNOVATIVE PROPERTIES COMPANY, St. Paul, MN (US)

(72) Inventors: Michael A. Haase, St. Paul, MN (US); Terry L. Smith, Roseville, MN (US); Barry J. Koch, Florence, TX (US); Ding Wang, Austin, TX (US); Alexander R. Mathews, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/420,466

(22) PCT Filed: Sep. 16, 2013

(86) PCT No.: PCT/US2013/059861
§ 371 (c)(1),
(2) Date: Feb. 9, 2015

(87) PCT Pub. No.: WO2014/055226
PCT Pub. Date: Apr. 10, 2014

(65) Prior Publication Data
US 2015/0234126 A1     Aug. 20, 2015

Related U.S. Application Data

(60) Provisional application No. 61/710,077, filed on Oct. 5, 2012.

(51) Int. Cl.
*G02B 6/38*     (2006.01)

(52) U.S. Cl.
CPC ............. *G02B 6/389* (2013.01); *G02B 6/3861* (2013.01); *G02B 6/3881* (2013.01)

(58) Field of Classification Search
CPC ... G02B 6/389; G02B 6/3861; G02B 6/3881
See application file for complete search history.

(56) References Cited

U.S. PATENT DOCUMENTS 4,405,201 A  *  9/1983  Cefarelli ............... G02B 6/383
                                                              385/59
4,479,697 A  *  10/1984  Kapany ............... G02B 6/2817
                                                              250/227.24

(Continued)

FOREIGN PATENT DOCUMENTS

JP          09211271 A  *  8/1997
WO    WO 2013-048730         4/2013

(Continued)

OTHER PUBLICATIONS

International Search report for PCT International Application No. PCT/US2013/059861 mailed on Jan. 2, 2014, 4 pages.

*Primary Examiner* — Peter Radkowski
(74) *Attorney, Agent, or Firm* — Robert S. Moshrefzadeh

(57) ABSTRACT

Optical connectors are provided for connecting sets of optical waveguides (104), such as optical fiber ribbons to each other, to printed circuit boards, or to backplanes. The provided connectors (100) include a housing (110) that has an attachment area (102) for receiving and permanently attaching a plurality of optical waveguides. Additionally, the provided connectors include a light coupling unit (120) disposed in and configured to move with the housing. The provided connectors also include a second attachment area (108) for receiving and permanently attaching to the plurality of optical waveguides that causes each optical waveguide to be bent between the two attachment areas. The provided connectors utilize expanded beam optics with non-contact optical mating resulting in relaxed mechanical precision requirements. The provided connectors can have low optical loss, are easily scalable to high channel count (optical fibers per connector) and can be compatible with low insertion force blind mating.

26 Claims, 7 Drawing Sheets

(56) References Cited

U.S. PATENT DOCUMENTS

| | | | |
|---|---|---|---|
| 5,381,498 A | 1/1995 | Bylander | |
| 5,757,997 A * | 5/1998 | Birrell | B08B 7/0028 385/60 |
| 6,026,210 A | 2/2000 | Berglund | |
| 6,086,263 A * | 7/2000 | Selli | B08B 7/0028 385/33 |
| 6,751,379 B2 * | 6/2004 | Capewell | G02B 6/29367 385/31 |
| 6,941,047 B2 * | 9/2005 | Capewell | G02B 6/29367 385/33 |
| 7,066,657 B2 | 6/2006 | Murali | |
| 7,458,729 B2 * | 12/2008 | Sasaki | G02B 6/3608 385/53 |
| 7,473,038 B2 | 1/2009 | Fujiwara | |
| 7,534,052 B2 | 5/2009 | Fujiwara | |
| 7,726,885 B2 | 6/2010 | Nishimura | |
| 7,963,704 B2 * | 6/2011 | Andrei | G02B 6/3897 385/69 |
| 8,165,432 B2 | 4/2012 | Ohta | |
| 8,469,610 B2 * | 6/2013 | Shao | G02B 6/4292 385/76 |
| 8,529,138 B2 * | 9/2013 | Duis | G02B 6/3826 385/137 |
| 8,548,287 B2 * | 10/2013 | Thacker | G02B 6/26 385/14 |
| 8,582,945 B2 * | 11/2013 | Duis | G02B 6/3652 385/115 |
| 8,641,296 B2 * | 2/2014 | Nishimura | G02B 6/4214 385/31 |
| 8,764,310 B2 * | 7/2014 | Duis | G02B 6/3839 385/137 |
| 8,913,858 B2 * | 12/2014 | Charbonneau-Lefort | G02B 6/4214 385/33 |
| 8,977,088 B2 * | 3/2015 | Castagna | G02B 6/4206 385/49 |
| 8,985,865 B2 * | 3/2015 | Howard | G02B 6/3829 385/79 |
| 9,052,478 B2 * | 6/2015 | Charbonneau-Lefort | G02B 6/4214 |
| 2002/0064191 A1 * | 5/2002 | Capewell | G02B 6/29367 372/14 |
| 2004/0033016 A1 * | 2/2004 | Kropp | G02B 6/30 385/31 |
| 2004/0165828 A1 * | 8/2004 | Capewell | G02B 6/29367 385/47 |
| 2005/0226566 A1 * | 10/2005 | Sasaki | G02B 6/3608 385/55 |
| 2009/0279832 A1 * | 11/2009 | Andrei | G02B 6/3897 385/69 |
| 2010/0135618 A1 * | 6/2010 | Howard | G02B 6/3829 385/79 |
| 2011/0064358 A1 * | 3/2011 | Nishimura | G02B 6/425 385/33 |
| 2011/0075972 A1 * | 3/2011 | Parkman, III | G02B 6/3871 385/78 |
| 2011/0317959 A1 | 12/2011 | Ohta | |
| 2012/0014648 A1 * | 1/2012 | Duis | G02B 6/3885 385/52 |
| 2012/0014649 A1 * | 1/2012 | Duis | G02B 6/3652 385/65 |
| 2012/0014650 A1 * | 1/2012 | Duis | G02B 6/3839 385/65 |
| 2012/0027346 A1 * | 2/2012 | Castagna | G02B 6/4206 385/33 |
| 2012/0033920 A1 * | 2/2012 | Haley | G02B 6/3834 385/78 |
| 2012/0033921 A1 * | 2/2012 | Haley | G02B 6/383 385/78 |
| 2012/0183256 A1 * | 7/2012 | Shao | G02B 6/4292 385/39 |
| 2013/0259419 A1 * | 10/2013 | Charbonneau-Lefort | G02B 6/32 385/14 |

FOREIGN PATENT DOCUMENTS

| | | |
|---|---|---|
| WO | WO 2013-048743 | 4/2013 |
| WO | WO 2013-180943 | 12/2013 |
| WO | WO 2014-055360 | 4/2014 |
| WO | WO 2014-055361 | 4/2014 |

* cited by examiner

OPTICAL CONNECTOR

RELATED CASE

The present application is related to jointly-owned patent applications, 61/710,083, entitled, "Optical Connector", and 61/710,067, entitled "Unitary Optical Ferrule" which were filed on the same date herewith and are herein incorporated by reference in their entireties.

TECHNICAL FIELD

The provided disclosure relates to optical connectors for connecting sets of optical waveguides such as optical fiber ribbons.

BACKGROUND

Optical fiber connectors can be used to connect optical fibers in a variety of applications including: telecommunications networks, local area networks, data center links, and for internal links in high performance computers. These connectors can be grouped into single fiber and multiple fiber designs and also grouped by the type of contact. Common contact methods include: physical contact wherein the mating fiber tips are polished to a smooth finish and pressed together; index matched, wherein a compliant material with an index of refraction that is matched to the core of the fiber fills a small gap between the mated fibers' tips; and air gap connectors, wherein the light passes through a small air gap between the two fiber tips. With each of these contact methods a small bit of dust on the tips of the mated fibers can greatly increase the light loss.

Another type of optical connector is referred to as an expanded beam connector. This type of connector allows the light beam in the source connector to exit the fiber core and diverge within the connector for a short distance before the light is collimated to form a beam with a diameter substantially greater than the core. In the receiving connector the beam is then focused back to its original diameter on the tip of the receiving fiber. This type of connector is less sensitive to dust and other forms of contamination that may be present in the region where the beam is expanded to the larger diameter.

Backplane optical connectors will become essential components of high-performance computers, data centers, and telecom switching systems in the near future, as line rates of data transmission migrate from the current 10 Gb/sec/line to 25 Gb/sec/line in the next few years. It would be advantageous to provide expanded beam connectors that are lower cost and higher performance alternatives to existing optical and copper connections that are currently being used in the 10 Gb/sec interconnects.

SUMMARY

The provided disclosure relates to optical connectors for connecting sets of optical waveguides, such as optical fiber ribbons, to waveguides disposed on printed circuit boards or backplanes. In particular, the provided connectors utilize expanded beam optics with non-contact optical mating resulting in relaxed mechanical precision requirements, thus enabling low-cost injection molding and improved resistance to dirt and damage. The provided connectors can have low optical loss, can be easily scalable to high channel count (optical fibers per connector), can provide safety to the user, and can be compatible with low insertion force blind mating. The provided connectors have suitability for use for backplane, front-plane, or mid-span connections.

In one aspect, a connector is provided that includes a housing comprising a first attachment area for receiving and permanently attaching to a plurality of optical waveguides and a light coupling unit disposed in and configured to move within the housing. The light coupling unit includes a second attachment area for receiving and permanently attaching to a plurality of optical waveguides received and permanently attached at the first attachment area. The light coupling unit also includes a plurality of curved surfaces, each curved surface corresponding to a different optical waveguide in a plurality of optical waveguides received and permanently attached at the first and second attachment areas, the optical waveguide having a first core diameter, the curved surface being configured to change a divergence of light from the optical waveguide such that light from the optical waveguide exits the connector having a second diameter greater than the first core diameter, the connector being configured so that when the connector mates with a mating connector in a first mating direction, the light coupling unit rotates to a different second direction causing the optical waveguide to bend.

In some embodiments, a provided connector can further include a light redirecting member that includes an input side for receiving input light from an optical waveguide received and permanently attached to at the first and second attachment areas. Additionally, the light redirecting member includes a light redirecting side for receiving light from the input side along a first direction and redirecting the received light along a different second direction. Finally, the light redirecting member includes an output side for receiving light from the light redirecting side and transmitting the received light as output light along an exit direction.

In another embodiment, a connector is provided that includes a housing comprising a first attachment area for receiving and permanently attaching to a plurality of optical waveguides, a light coupling unit disposed in and configured to move within the housing and including a second attachment area for receiving and permanently attaching to a plurality of optical waveguides received and permanently attached at the first attachment area. The provided connector also includes a first waveguide alignment member for receiving and aligning the at least one first optical waveguide, a first light redirecting member comprising an input side of the first light redirecting member for receiving input light along an input direction of the first light redirecting member from a first optical waveguide disposed and aligned at the first waveguide alignment member, a light redirecting side of the first light redirecting member for receiving light from the input side of the first light redirecting member along an input direction and redirecting the light along a different redirected direction of the first light redirecting member; and an output side of the first light redirecting member for receiving light from the light redirecting side of the first light redirecting member and transmitting the received light as output light exiting the first light redirecting member along an output direction of the first light redirecting member toward an input side of a first light redirecting member of a mating connector, the first light redirecting member having a greater than one refractive index between the input and output side. The light coupling unit is configured to change the direction of light from at least one of the plurality of optical waveguides such that the light from the optical waveguide exits the connector along an output direction different than a mating direction of the connector, the connector being configured so that when the connector mates with a mating connector in a mating direction, the light coupling unit rotates in a mating direction causing the optical waveguide to bend.

The provided connector also includes a second waveguide alignment member vertically offset from the first waveguide alignment member for receiving and aligning at least one second optical waveguide and a second light redirecting member vertically offset from the first light redirecting member and includes an input side of the second light redirecting member for receiving second input light from a second optical waveguide disposed and aligned at the second waveguide alignment member, a light redirecting side of the second light redirecting member for receiving light from the input side of the second light redirecting member along the input direction of the second light redirecting member and redirecting the received light along a redirected direction of the second light redirecting member and an output side of the second light redirecting member for receiving light from the light redirecting side of the second light redirecting member and transmitting the received light as an output light of the second light redirecting member toward an input side of a light redirecting member of a mating connector. Finally, the provided connector includes first and second registration features for mating with registration features of a mating connector along a connector mating direction different than the output direction. The connector is configured so that when the connector mates with the mating connector, the output side of the second light redirecting member faces the input side of the second light redirecting member of the mating connector.

The provided optical connectors use expanded beam optics with non-contact mating that can result in relaxed mechanical fabrication requirements. This can, in turn, enable the use of processes such as low-cost injection molding and can result in connectors that have improved resistance to dirt and contamination. The provided connectors can have low optical loss, typically less than 1.0 dB per mated connector pair. Additionally, the provided connector can be easily and economically scaled to have 256 or more connected optical waveguides. The provided connectors have a low insertion force, blind mating and are suitable for high speed backplane, front-plane, or mid-span connections.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein:

FIG. 2b is a portion of what is shown in FIG. 2a.

FIG. 5b is a perspective view of FIG. 5a.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
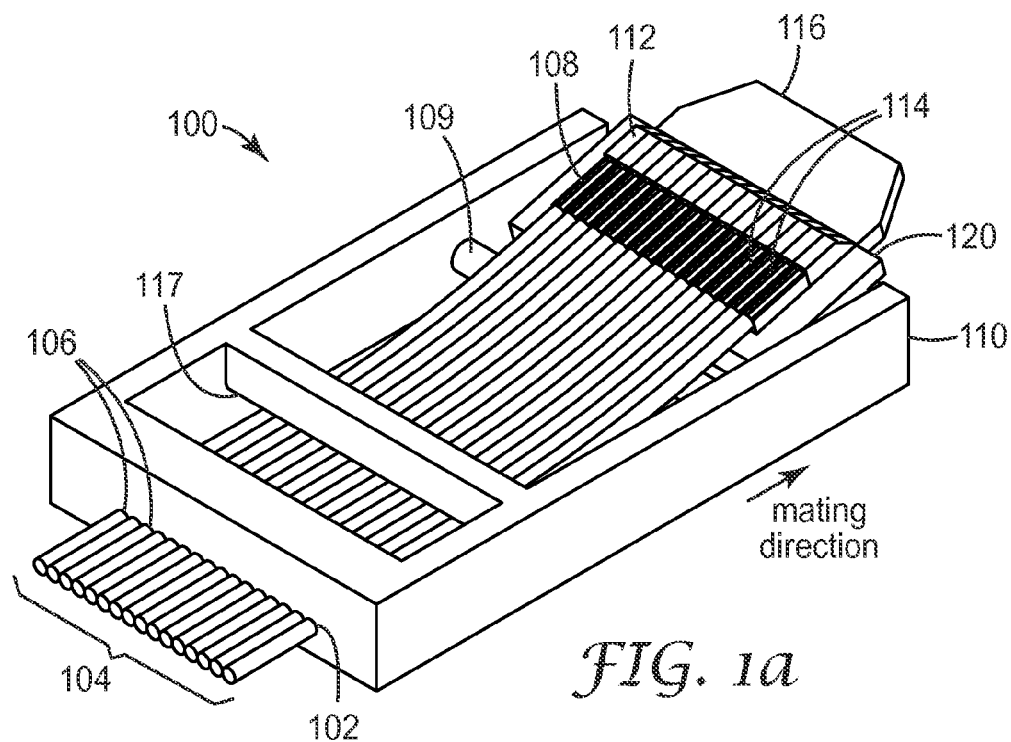
FIG. 1a is a perspective view of an embodiment of a provided connector.

The optical cables used in many applications make use of fiber ribbons. These ribbons are comprised of a set of coated fibers joined together in a line (typically 4, 8 or 12 fibers in a line). The individual glass fibers with their protective coatings are typically 250 microns in diameter and the ribbons typically have a fiber to fiber pitch of 250 microns. This 250 micron spacing has also been used in optical transceivers with a variety of designs spacing the active optical devices at the same 250 micron spacing.

Currently available expanded beam multiple fiber connectors typically limit the beam diameter to 250 microns to match the ribbon pitch. In order to achieve a beam diameter greater than the fiber pitch, current connectors require the fiber ribbon to be manually split into single fibers before mounting the fibers on the connector.

In general, single fiber optical connectors can include a precision cylindrical ferrule for aligning and contacting optical fiber end faces with each other. The optical fiber can be secured in the central bore of the ferrule so that the fiber's optical core can be centered on the ferrule axis. The fiber tip can then be polished to allow physical contact of the fiber core. Two such ferrules can then be aligned with each other using an alignment sleeve with the polished fiber tips pressed against each other to achieve a physical contact optical connection from one fiber to another. Physical contact optical connectors are widely used.

Multiple fiber connectors often use a multiple fiber ferrule such as the MT ferrule to provide optical coupling from the source fibers to the receive fibers. The MT ferrule can guide the fibers in an array of molded bores to which the fibers are typically bonded. Each ferrule can have two additional bores in which guide pins are located to align the ferrules to each other and thus align the mated fibers.

A variety of other methods have also been used to make fiber to fiber connections. Included are V-groove alignment systems and bare fiber alignment in an array of precise bores. Some such connecting concepts make use of lenses and or reflecting surfaces in optical fiber connections. Each of these connecting concepts describes single purpose connection systems, such as an in line connector or a right angle connector.

Optical fiber interconnects such as multiple fiber connectors are useful for connecting optical waveguides to waveguides disposed on printed circuit boards (PCBs) and in backplane optical interconnect products. Expanded beam connectors have been disclosed that can terminate fiber ribbons without separating individual fibers and also can provide a beam with a diameter greater than the fiber-to-fiber pitch. These expanded beam optical connectors have non-contact optical mating and can require less mechanical precision than conventional optical connectors.

Novel optical interconnect coupling constructions (optical couplers or optical connectors) are provided that can be used to connect one or more optical waveguides, or a ribbon of optical waveguides to another set of optical waveguides or one or more ribbons of optical waveguides. In some embodiments, the waveguides can be optical fibers. The provided connectors can also be used to connect one or more optical waveguides, or ribbons of optical waveguides to waveguides disposed on or in printed circuit boards or backplanes. The provided connectors include expanded beam optics with non-contact optical mating to provide relaxed mechanical precision requirements for their construction, thus enabling low-cost injection molding and improved resistance to dirt. The provided connectors can have low optical loss, can be easily scalable to high channel count (optical fibers per connector), can provide safety to the user, and can be compatible with low insertion force blind mating. The provided connectors have suitability for use for backplane, front-plane, or mid-span connections.

In the following description, reference is made to the accompanying drawings that forms a part hereof and in which are shown by way of illustration. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if an object depicted in the figures is turned over or flipped over, portions previously described as below or beneath other elements would then be above those other elements.

As used herein, when an element, component or layer for example is described as forming a "coincident interface" with, or being "on", "connected to," "coupled with", or "in contact with", or "adjacent to" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as begin "directly on," "directly connected to," "directly coupled with," or "directly in contact with" another element, there are no intervening elements, components or layers for example.

The provided connector can be understood, but should not be limited by, the embodiment illustrated in FIG. 1a. FIG. 1a shows connector 100 that is an embodiment of a provided parallel expanded beam optical connector. In FIG. 1a, connector 100 includes housing 110 which has first attachment area 102. First attachment area 102 is the part of housing 110 where one or more optical waveguides, such as plurality of optical waveguides 104 (ribbon of optical waveguides 104) shown in FIG. 1a first contacts housing 110 and, in the embodiment shown in FIG. 1a, passes through via holes 106 into the interior of housing 110. One or more optical waveguides 104 can be received and permanently attached to housing 110 where they contact housing 110 in via holes 106 and where they pass over, but are not permanently attached to, first waveguide support 109. Second attachment area 108 includes a plurality of waveguide alignment members 114. Waveguide alignment members 114 can be configured to accommodate a different optical waveguide in plurality of optical waveguides 104 received and permanently attached to at first attachment area 102. In some embodiments, the optical waveguide can be bonded to first attachment area 102 at via hole 106. The first attachment area can include a plurality of grooves (not shown in FIGS. 1a-b, but shown in FIGS. 2a-b), each groove being configured to accommodate a different optical waveguide in a plurality of waveguides received and permanently attached at the first attachment area. The individual optical waveguides can be attached to the first attachment area at a corresponding via hole 106. Provided connector 100 also includes light coupling unit 120 that is the part of connector 100 that can mate with another connector attached to another device such as a second provided optical connector which may stand alone or be located on a printed circuit board or backplane.

In some embodiments, the housing can include first waveguide support 109 disposed between the first attachment area 106 and second attachment area 108 for supporting, but not being permanently attached to, an optical waveguide received and permanently attached to at the first and second attachment areas. The housing can also include second waveguide support 117 disposed between first waveguide support 109 and the first attachment area 102 for supporting, but not being permanently attached to, an optical waveguide received and permanently attached to at the first and second attachment areas, such that when the connector mates with a mating connector, the optical waveguide further bends causing the optical waveguide to separate from the second support. In some embodiments, an optical waveguide that is permanently attached at the first and second attachment areas can be bent between the two attachment areas (first and second attachment areas) in a plane formed by the mating direction and the direction of light exit (output direction) from the light coupling unit. In some embodiments, an optical waveguide permanently attached at the first and second attachment areas can be bent between the two attachment areas in a plane perpendicular to an axis around which the optical coupling unit rotates during mating. In some embodiments, an optical waveguide that is permanently attached to the first and second attachment areas can be bent in a bend direction that lies in a plane parallel to a plane defined by the rotation of the optical coupling unit.

Light coupling unit 120 also includes mechanical mating tongue portion 116, interlocking mechanism 118, and second attachment area 108. The tongue portion 116 has a tapering width along at least a portion of the length of the tongue portion and extends outwardly from the light coupling unit. When the connector 100 moves toward a mating connector 300' (shown in FIG. 3a), the tongue portion is guided in a corresponding tongue recess 30 of the mating connector in such a way that a misalignment, such as a lateral misalignment, between the two connectors is corrected. In some cases, when the connector moves toward the mating connector, the first contact between the connector and the mating connector is between the tongue portion of the connector and the tongue recess of the mating connector.

Figure 1B:
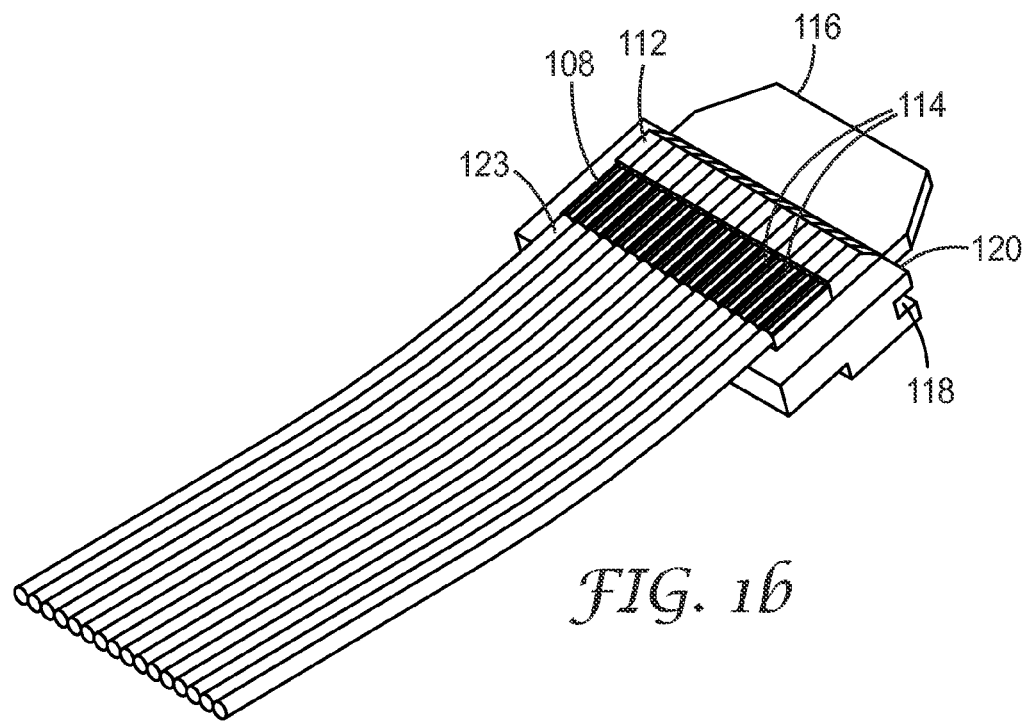
FIG. 1b is the same perspective view as in FIG. 1b with the housing removed.

These features are more easily seen in FIG. 1b where housing 110 has been removed for a clearer view. Second attachment area 108 includes plurality of V-grooves 114 each groove being configured to accommodate a different optical waveguide in a plurality of optical waveguides received and permanently attached to at the first attachment area, the optical waveguide being bonded to the second attachment area at the groove. In some embodiments, the second attachment area can permanently attach to a plurality of optical waveguides received and permanently attached to at the first attachment area. In some embodiments, the optical waveguides are attached at the first attachment area, the second attachment area, or both, using an adhesive. In cases where the optical waveguides are optical fibers, the fiber attachment areas may consist of cylindrical holes into which the fibers are bonded. Also in cases where the waveguides are optical fibers, the polymer buffer layer on the fiber may be bonded to a buffer attachment area 123 adjacent to the area 108 where the bare fiber is bonded, in order to enhance the mechanical strength of the assembly. In such cases, the connector includes a first attachment area 106, a second attachment area 108 and a third attachment area 123.

In some embodiments, a connector is provided wherein an optical waveguide received and permanently attached to the first and second attachment areas can be bent between the two attachment areas and wherein when the connector mates with a mating connector, the light coupling unit rotates causing the optical waveguide to bend further. In other embodiments, a connector is provided wherein the light coupling unit can rotate about an axis that changes position as the light coupling unit rotates. In some embodiments, when the light coupling unit rotates it can also move linearly. In some embodiments, a connector is provided that is configured so that when the connector mates with a mating connector, the light coupling unit can rotate within the housing by making contact with a corresponding light coupling unit of the mating connector. In some embodiments wherein the light coupling unit rotates, the corresponding light coupling unit of the mating connector may not substantially move. In other embodiments, the provided connector is configured so that when the connector mates with the mating connector, the light coupling unit in each connector can rotate. In some embodiments, when the provided connector mates with a mating connector, optical waveguides of the two connectors can lie in a same plane. In some embodiments, when the provided connector has a first plurality of optical waveguides attached thereto mates with a mating connector having a second plurality of optical waveguides attached thereto, the first and second pluralities of optical waveguides can lie in the same plane. In some embodiments, when the provided connector has a first plurality of optical waveguides attached thereto mates with a mating connector having a second plurality of optical waveguides attached thereto, the first plurality of optical waveguides can lie in a first plane and the second plurality of optical waveguides can lie in a second plane that is parallel to and offset form the first plane.

In some embodiments, the second attachment area of a provided connector can be disposed between the first attachment area and the plurality of curved surfaces. In some embodiments, when an optical waveguide is received and permanently attached to at the first and second attachment areas, the optical waveguide can be under a first bending force and when the connector mates with a mating connector, the optical waveguide can be under a second bending force greater than the first bending force. In some embodiments, the first bending force can be substantially zero.

In some embodiments, a connector is provided wherein the light from the optical waveguide can exit the connector in an exit direction that is different than the mating direction. In some embodiments, a connector is provided that can have an optical waveguide permanently attached at the first and second attachment areas that can be bent between the two attachment areas in a plane formed by the mating and light exit directions. In some embodiments, a connector is provided that can be configured to receive a plurality of optical waveguides, each waveguide comprising an optical fiber. In some embodiments, the light coupling unit can be a unitary construction meaning that the light coupling unit does not have any internal interfaces, joints, or seams. In some cases, a unitary structure or construction is capable of being formed in a single forming step such as machining, casting or molding.

Light coupling unit 120 is configured so as to be able to move within housing 110. This facilitates proper alignment of light coupling unit 120 with an additional coupler (typically a coupler with substantially identical features) as will be shown in subsequent drawings. In some cases, the plurality of optical waveguides 104 are bent between first attachment area 102 and second attachment area 108. In some embodiments, the optical waveguides can be bent between the two attachment areas in a plane formed by the mating direction, described above and an exit direction defined as the direction of the optical waveguides when they are received and permanently affixed to the second attachment area. During mating with another mating connector, the second attachment area that includes the light coupling unit can move with the housing and can cause the optical waveguide to further bend with a first additional bend resulting in the optical waveguide separating from the second support. As the two mating connectors further engage (for example, in order to cause mechanical interlocking) a second additional bend can result that causes the optical waveguide to separate from the first support. The movement of the light coupling unit can cause the light coupling unit to make contact with a corresponding light coupling unit of the mating connector. This is further illustrated in FIGS. 3-5. In some embodiments, as the connectors engage, the light coupling unit can move with the housing along at least two mutually orthogonal directions. In some embodiments, during mating of two provided connectors, the light coupling unit in each connector can move. In some embodiments, the two optical connectors can lie in the same plane. In some embodiments, where the connectors have a plurality of optical waveguides, the first and second plurality of optical waveguides can lie in a same plane. In some embodiments, the first plurality of optical waveguides lie in a first plane and the second plurality of optical waveguides can lie in a second plane that is parallel to and offset from the first plane. In some embodiments, the second attachment area can be disposed between the first attachment area and the plurality of curved surfaces. In some embodiments, each optical waveguide of the connector can be under a first compressive force and, when the connector is mated, the optical waveguide can be under a second compressive force greater than the first compressive force. In some embodiments, the first compressive force on the first optical waveguide can be substantially zero.

In some embodiments, a connector is provided where the light coupling unit can include a light redirecting member. The light redirecting member can have an input side for receiving input light from an optical waveguide received and permanently attached to at the first and second attachment area. The light redirecting member can also have a light redirecting side for receiving light from the input side in a second direction and redirecting the received light in a different third direction. The light redirecting member can also have an output side for receiving light from the light redirecting side and transmitting the received light as output light. In some embodiments, the light redirecting member can have a same greater than one index of refraction between the input and output sides. In some embodiments, each curved surface in the plurality of curved surfaces can be disposed on the input side, the light redirecting side, or the output side of the light redirecting member. In some embodiments, the light redirecting member and the plurality of curved surfaces can form a unitary construction. In some embodiments, the second direction can be different than the mating direction. In some embodiments, the third direction can be different from the mating direction.

In the embodiments shown in the provided figures, the plurality of light redirecting members can be more complex and can include, for example, an optical element that has an input side for receiving input light from an optical waveguide and a light redirecting side for receiving light from the input side along a first direction defined by the optical waveguides in the v-grooves. The light redirecting members can redirect the received input light along a different second direction. The light redirecting members can also include an output side for receiving light from the light redirecting side and transmitting the received light as output light along the exit direction.

Figure 2A:
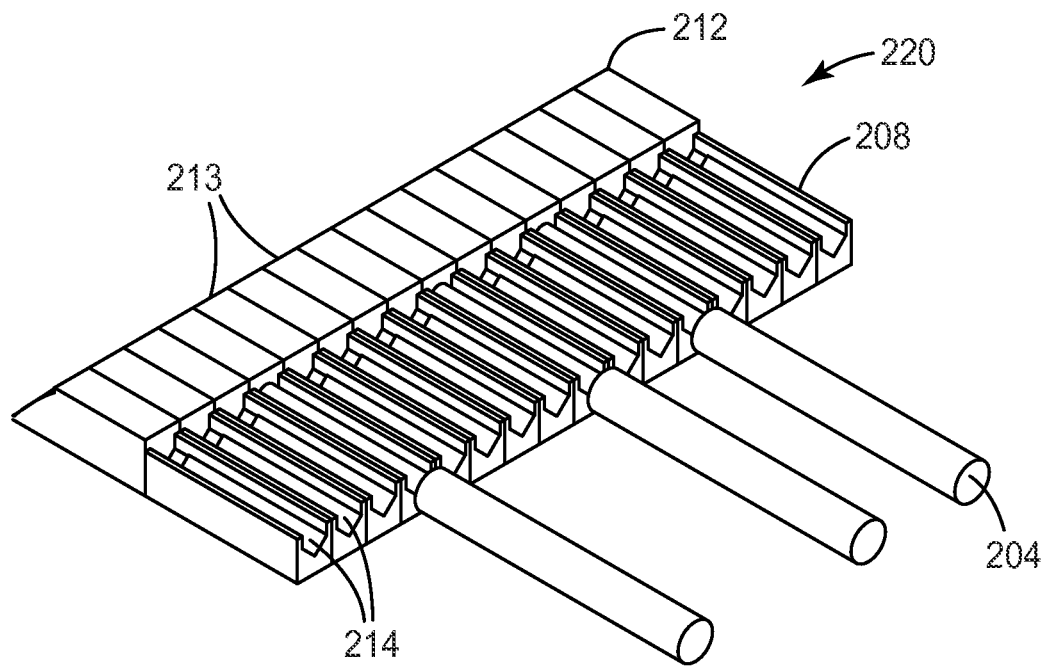
FIG. 2a is a perspective view of an optical waveguide alignment member and a light redirecting member.
Figure 2B:
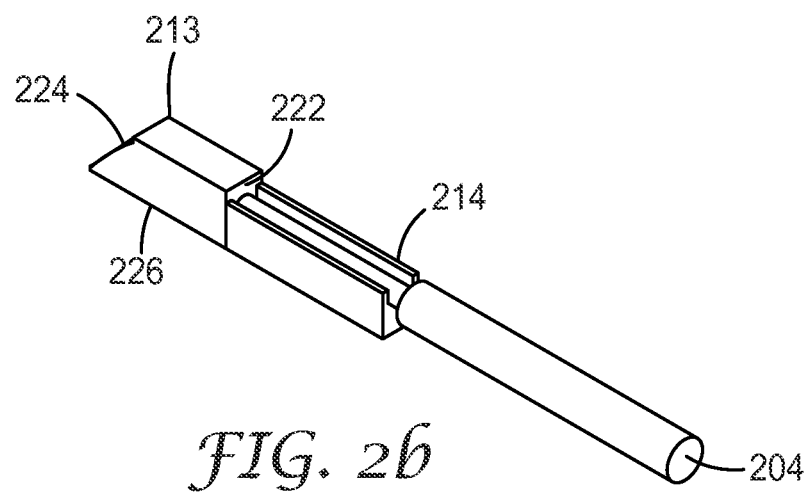

FIGS. 2a-b are cutaway views of a portion of a provided connector assembly focusing on the first waveguide alignment member and light redirecting member. FIG. 2a, is a cut-away perspective view of the light coupling unit 220 and light redirecting member 212 of the provided connector illustrating the attachment of several optical fibers 204 to light coupling unit 220. Optical fibers 204 are aligned in grooves 214, typically V-grooves, to which they are permanently attached. The exit end of optical fibers 204 is situated so as to be able to direct light emanating from the optical fiber into the input side 222 or face of light redirecting member 212. Light redirecting member 212 includes an array of light redirecting elements 213, at least one for each optical fiber attached to light coupling unit 220. Typically, the light redirecting element 213 includes a prism. Light redirecting member 212 includes an array of light redirecting elements 213, one for each optical waveguide of plurality of optical waveguides (optical fibers) 204 to be joined the provided connector.

FIG. 2b is a cutaway view of a portion of a provided connector that includes just one light directing element 213, one first waveguide alignment member, e.g V-groove 214, and one optical fiber 204. In this illustration, optical fiber 204 is aligned in V-groove 214 and may be permanently attached to it. At the point of attachment, the fiber buffer and protective coating (if any) have been stripped away to allow only the bare optical fiber to lie aligned and permanently affixed to V-groove 214. Light redirecting element 213 includes light input side 222 for receiving input light from first optical waveguide (optical fiber) 204 disposed and aligned at first waveguide alignment member 214. Light redirecting element 213 also includes light redirecting side 224 for receiving light from the input side along an input direction and redirecting the received light along a different redirected direction. The light redirecting element also includes output side 226 that receives light from light redirecting side 224 of light redirecting element 213 and transmits the received light as output light along an output direction toward an input side of a first light redirecting member of a mating connector (not shown in FIG. 2b but shown in FIG. 3). In some cases, at least one of the input side, light redirecting side, and the output side includes includes one or more curved surfaces for changing a divergence of light that exits optical waveguide 204. In some embodiments, such as when a curved surface is part of the light redirecting side 224, the curved surfaces can be part of a curved mirror or a light reflecting lens. In some embodiments, such as when the curved surfaces are part of the output side 226, the curved surfaces can be light transmitting lenses. In some embodiments, each curved surface in the plurality of curved surfaces can be configured to collimate light from an optical waveguide corresponding to the curved surface. When the connector mates with a mating connector, it is configured so that the output side of the first light redirecting member 226 faces the input side of the first light redirecting member of the mating connector and the first and second registration features of the connector (not shown in FIG. 2b but shown in FIG. 1) mate with the registration features of a mating connector. In some embodiments, a provided first connector can be configured to mate with a provided second connector. When a provided first connector is configured to mate with a provided second connector, the first and second connector can be so oriented relative to each other that the first and second registration features of the first connector mate with the respective second and first registrations features of the second connector. In some embodiments, when a provided connector mates with a mating connector, light from each first optical waveguide disposed and aligned at the connector can be coupled to a corresponding optical waveguide disposed and aligned at the mating connector. In some embodiments, when a provided connector mates with a mating connector, segments of the optical waveguides of the provided connector and the mating connector that are attached to the respective second attachment areas of the respective optical coupling units can lie in a same plane. In some embodiments, the connector can have a first plurality of optical waveguides attached to a first optical coupling unit. When the connector mates with a mating connector having a second plurality of optical waveguides attached to a second optical coupling unit, the segments of the first and second pluralities of optical waveguides attached to the coupling units can lie in a same plane. In some embodiments, the connector having a first plurality of optical waveguides attached to a first optical coupling unit can mate with a mating connector having a second plurality of optical waveguides attached to a second optical coupling unit, the segments of the first plurality of optical waveguides attached to the first optical coupling unit lie in a first plane and the second plurality of optical waveguides attached to the second optical coupling unit lie in a second plane that is parallel to and offset from the first plane.

Referring to FIGS. 2a-b, each waveguide of plurality of optical waveguides 204 is received and permanently attached to an individual V-groove 214 in second attachment area 208. In some embodiments, the light coupling unit can be a unitary construction. Light coupling unit 220 includes a plurality of light redirecting members 212.

Second attachment area 208 is arranged so that light emanating from each of the plurality of optical waveguides impinges on a corresponding input surface of the plurality of light redirection elements, then impinges on a corresponding light redirecting side 224 which in some embodiments can include a curved surface. Each optical waveguide of plurality of optical waveguides 204 has a first core diameter. The corresponding curved surface for each individual optical waveguide is configured so as to change a divergence of light from the individual optical waveguide such that light emanating from the individual optical waveguide exits the connector propagating along an exit direction that is different from the mating direction of the connector. The emanating light has a second diameter greater than the first core diameter due to the interaction of the light with the curved surface. In some embodiments, the ratio of the second diameter to the first core diameter can be at least 2, at least 3.7, or even at least 5.

In some embodiments, a connector can be provided in which the first light redirecting member can have a same greater than one index of refraction between the input and the output sides.

Figure 3A:
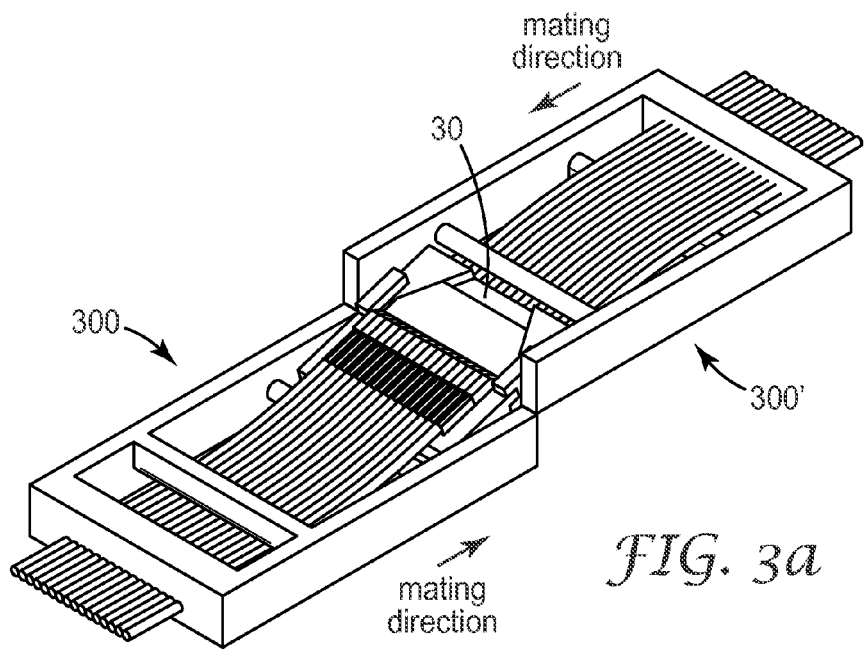
FIGS. 3a-b are perspective views of two provided connectors mated together.
Figure 3B:
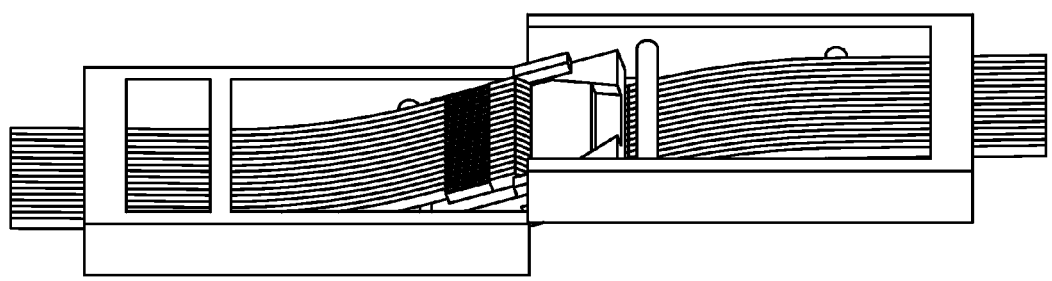

FIGS. 3a and 3b are perspective views of two connectors embodied in FIGS. 1a and 1b mated together. In the illustrated embodiment, the two mated connectors include first connector 300 (shown as positioned in FIG. 1a) and first mating connector 300' that is oriented upside down and reversed right to left from first connector 300. The two connectors are in a mated configuration. First connector 300 and first mating connector 300' are mechanically interlocked with mechanical coupling members (not shown in FIGS. 3a and 3b, but shown in FIG. 1b). The mating direction for first connector 300 is different than the mating direction of first mating connector 300'. In the illustrated embodiment, the angle between the two mating directions is 180 degrees. This type of connector is known as a straight-through connector. However, it is envisioned that this is not a limitation on the provided couplers and that the angle between the two mating directions could be any angle other than 0 degrees. In some embodiments, the angle between the two connectors can be, for example, 90 degrees—a right-angled coupler. In some cases, the two connectors may not be identical in shape so that can mate in non-linear directions.

Figure 4A:
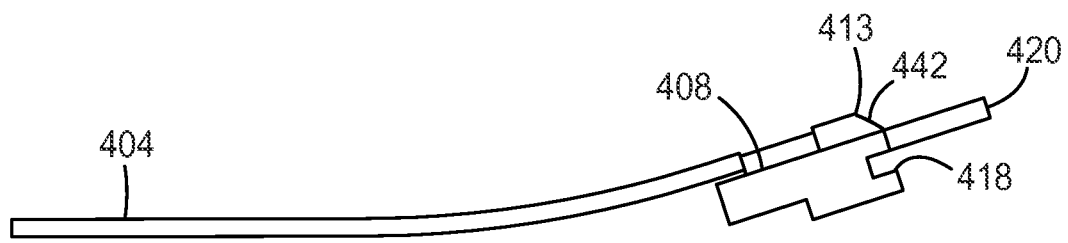
FIGS. 4a-b are cutaway side views of the connector shown in FIG. 1b.
Figure 4B:
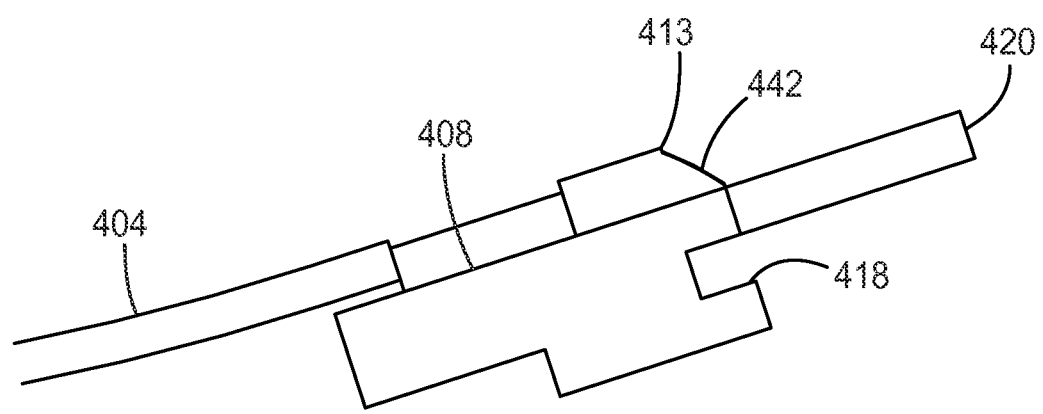

FIGS. 4a and 4b are cutaway side views of the connector illustrated in FIG. 1b (without the housing shown) with only one optical waveguide of the plurality of optical waveguides shown for illustration purposes. Optical waveguide 404 resides in V-grooves and is received and permanently attached to second attachment area 408. Light emanating from the end of optical waveguide 404 is coupled into light redirecting element 413. Light redirecting element 413 includes light redirecting surface 442 that, in the illustrated embodiment, is a curved light reflecting mirror or lens. The light beam the light redirecting element from the optical waveguide 404 expands in diameter as it propagates unit it is reflected by surface 442. FIG. 4a shows the optical waveguides as being bent before entering second attachment area 408. This has been discussed above. Mechanical coupling member 418 and mating tongue 420 are used to guide, link, and position two mated couplers.

Figure 5A:
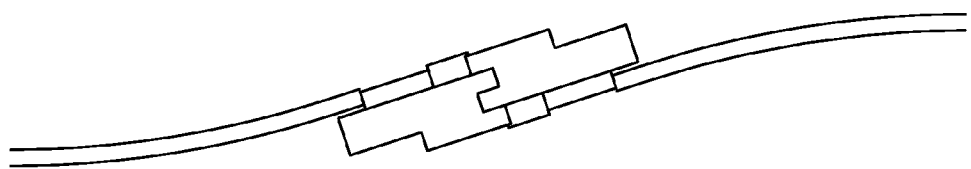
FIG. 5a is a side view of an embodiment of two identical mated right angle connectors with the housing removed.
Figure 5B:
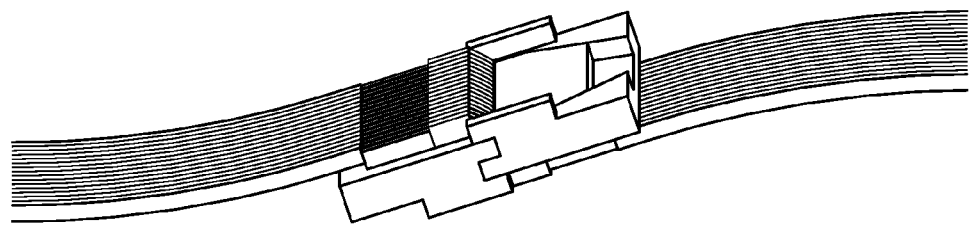

FIGS. 5a and 5b are illustrations of two mated right angle connectors such as those shown in FIGS. 4a and 4b with the housing removed for illustrative purposes. FIG. 5a is a side view and FIG. 5b is a perspective view of the mated connectors. In the illustration the two connectors are mechanically coupled as shown. In some embodiments, when the connector mates with a mating connector, the light coupling unit can rotate at least 0.5 degrees. In other embodiments, when the connector mates with a mating connector, the light coupling unit can rotate at least 2.0 degrees. In some embodiments, when the connector mates with a mating connector, the light coupling unit can rotate at most 90 degrees.

Figure 5C:
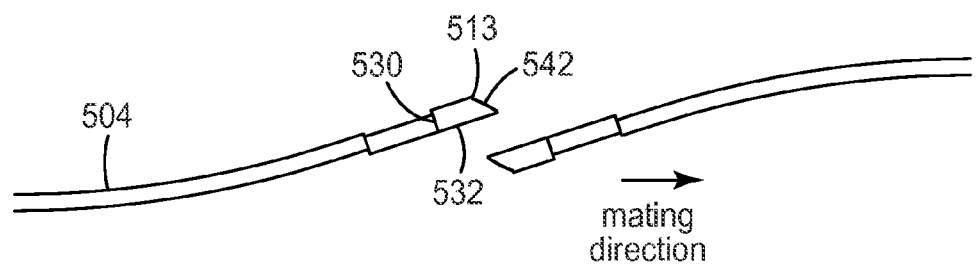
FIG. 5c is a side view of FIGS. 5a and 5b showing the spatial relationship of the two mated fibers.

FIG. 5c illustrates the spatial positioning of the two respective light redirecting members in mated position. Light redirecting element 513, in this embodiment, includes input side 530 for receiving light from optical waveguide 504, light redirecting side 542 (that includes a curved surface), and output side 532 where an expanded and redirected beam emanates from the light redirecting member at an average angle of about 90 degrees from the entrance angle. However, since the beam may be divergent or convergent after being redirected from the light redirecting side, the angle only averages about 90 degrees when it exits the light redirecting member. In some embodiments, the light redirecting member has a same greater than one index of refraction between the input and output sides. The light redirecting member from the second connector is positioned, in this illustration, below the light redirecting member from the first connector so as to capture a majority of the light beam emanating from the first light redirecting member. The light emanating from the first light redirecting member can travel through air before it is captured by the light redirecting member from the second connector. In some embodiments, each curved surface in the plurality of curved surfaces can be disposed on the input side, the light redirecting side, or the output side of the light redirecting member. As one of ordinary skill in the art will understand, the curved surface of the second connector can capture the divergent and redirected light beam, focus it and again redirect it into the optical waveguides affixed to the second connector using the same principles just described.

Figure 6:
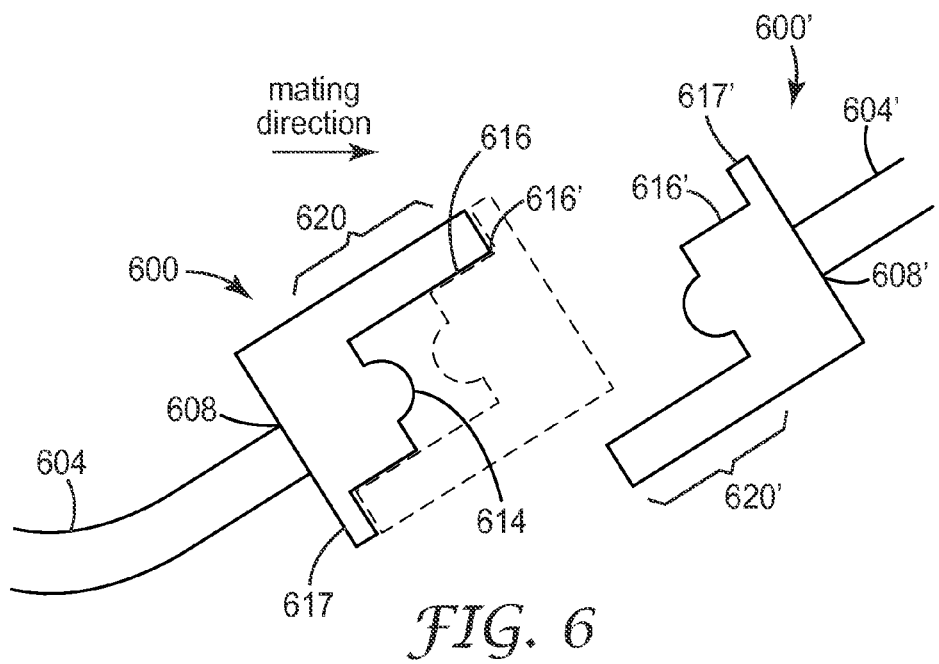
FIG. 6 is a view of an embodiment of a straight-through connector.

FIG. 6 is an illustration of a provided straight through first light coupling unit 620 of first connector 600 and mated first light coupling unit 620' of first mated connector 600' where the angle between the input light beam direction and the output light beam direction is about 180 degrees. First light coupling unit 620 has first optical waveguide 604 received and permanently attached to first light coupling unit 620 at second attachment area 608 of first optical waveguide 604. First connector 600 and first mated connector 600' include connector bodies that include housings as described in previous embodiments. They are not shown in FIG. 6 so that the positions of the couplers during mating can be seen. Additionally, first connector 600 and first mated connector 600' include stops 617 and 617' to prevent the light redirecting members from the connector and the mating connector from colliding. Light is coupled from first light coupling unit 620 into first light redirecting member 614. First light redirecting member 614 is typically a lens that can direct the light passing through it to diverge, focus, or collimate. The first attachment area for first connector 600 is not shown and is to the left as shown in the drawing before the bend in first optical waveguide 604. Typically, the first attachment area may be a frame member of a housing in which first connector 600 resides. Analogously, first light coupling unit 620' of first mating connector 600' has first optical waveguide 604' received and permanently attached to first light coupling unit 620' at second attachment area 608' of first optical waveguide 604'.

In the embodiment of a provided straight through connector as shown in FIG. 6, first light coupling unit 620 of first connector 600 and mated first light coupling unit 620' of first mated connector 600' can approach each other in the mating direction as shown in the drawing. During the actual mating process, the connectors are caused to approach one another along the mating direction until the mating connector ends up in the position shown by the dotted lines wherein there is contact between two flat portions at contact points 616 and 616'. Then first light coupling unit 620 of first connector 600 and light coupling unit of first mating connector 600' can be made to slide so that the distance between first light redirecting member 614 and mating light redirecting member 614' is at an optimum mating position for proper light coupling between the two connectors. In some cases, such as in the exemplary case shown in FIG. 6, when the connector 600 mates with the mating connector 600', segments of the optical waveguides of the two connectors which are attached to the respective second attachment areas 608 and 608' of the optical coupling units lie in the same plane. Similarly, when the connector 600 having a first plurality of optical waveguides 604 attached to the light coupling unit 620 mates with the mating connector 600' having a second plurality of optical waveguides 604' attached to the light coupling unit 620', the segments of the first and second pluralities of optical waveguides that are attached to the first and second coupling units lie in the same plane.

Figure 7:
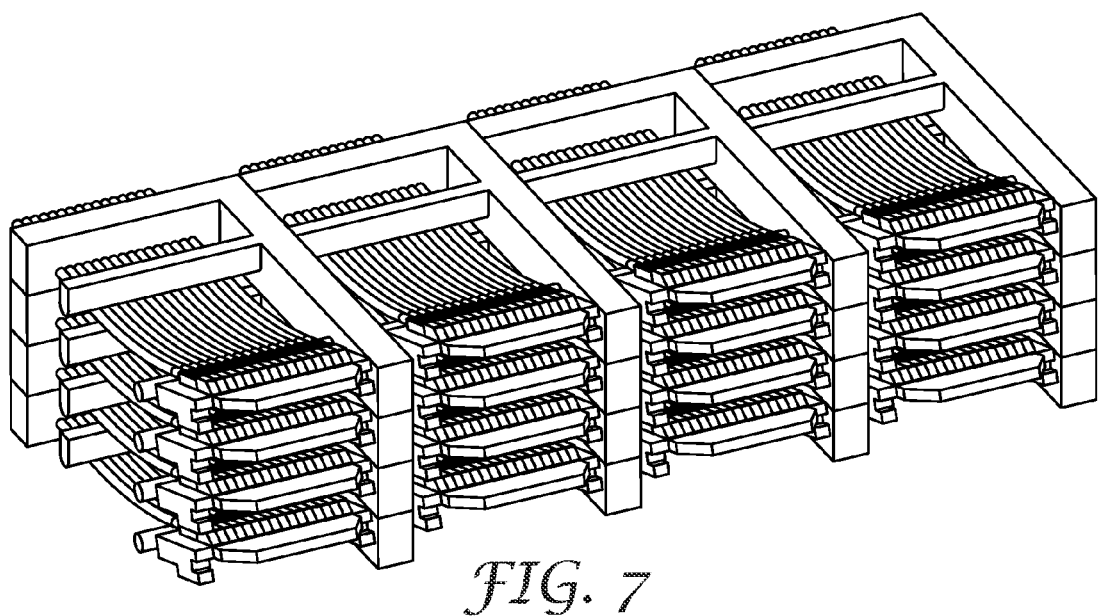
FIG. 7 is a view of an embodiment of an array of connectors.

Also provided is an array of provided connectors. As illustrated in FIG. 7, it is contemplated that a linear array of connectors can be created with a housing that can mount a plurality of provided connectors. The first attachment area can be part of the housing itself. FIG. 7 is a drawing of a 4×4 array of provided connectors each having 16 optical waveguides attached thereto. Other arrays are within the scope of this disclosure including, for example, 1×16 arrays of provided connectors each having 16 optical waveguides attached thereto.

In some embodiments, a provided connector can a include first waveguide alignment member for receiving and aligning at least one first optical waveguide, a first light redirecting member that includes an input side for receiving input light from a first optical waveguide disposed and aligned at the first waveguide alignment member, a light redirecting side for receiving light from the input side along a first direction and redirecting the received light along a different second direction, and an output side for receiving light from the light redirecting side and transmitting the received light as output light toward an input side of a first light redirecting member of a mating connector. The connector can be configured so that when the connector mates with the mating connector, the first and second registration features mate with or engage registration features of the mating connector resulting in the output side of the first light redirecting member facing the input side of the first light redirecting member of the mating connector.

In other embodiments, the provided connector can further include a second waveguide alignment member vertically offset from the first waveguide alignment member for receiving and aligning at least one second optical waveguide, and a second light redirecting member vertically offset from the first light redirecting member. The second light redirecting member can include an input side for receiving input light from a second optical waveguide disposed and aligned at the second waveguide alignment member, a light redirecting side for receiving light from the input side along the first direction and redirecting the received light along the second direction, and an output side for receiving light from the light redirecting side and transmitting the received light as output light toward an input side of a second light redirecting member of a mating connector, the connector being configured so that when the connector mates with the mating connector, the output side of the second light redirecting member faces the input side of the second light redirecting member of the mating connector. In some embodiments, the provided connector can be configured to receive the at least one first optical waveguide and the at least one second optical waveguide from a same optical cable. In some embodiments the provided connector can be configured to receive the at least one first optical waveguide from a first optical cable and the at least one second optical waveguide from a different second optical cable. In some embodiments, a connector is provided where the second waveguide alignment member and the second light redirecting member can be vertically offset in a same direction from the first waveguide alignment member and the first light redirecting member. In some embodiments, the provided connector can include an insulative housing, the first and second waveguide alignment members, the first and second light redirecting members, and the insulative housing being a unitary construction. In some embodiments, the provided connector can include a first light block vertically offset from a second light block, so that when the connector is not mated with a mating connector, light exiting the output side of the first light redirecting member can be blocked by the first light block and light exiting the output side of the second light redirecting member can be blocked by the second light block. Also provided is a connector wherein the first waveguide alignment member includes a first plurality of waveguide alignment elements and the second waveguide alignment member includes a second plurality of waveguide alignment elements, each waveguide alignment element in the first plurality of waveguide alignment elements being configured to receive and align a different first optical waveguide, each waveguide alignment element in the second plurality of waveguide alignment elements being configured to receive and align a different second optical waveguide, each waveguide alignment element in the first plurality of waveguide alignment elements being vertically and horizontally offset from each waveguide alignment element in the second plurality of waveguide alignment elements. In some embodiments, a connector is provided wherein the first light redirecting member can include a first plurality of light redirecting elements and the second light redirecting member can include a second plurality of light redirecting elements, each light redirecting element in the first plurality of light redirecting elements corresponding to a different first optical waveguide received and aligned at the first waveguide alignment member, each light redirecting element in the second plurality of light redirecting elements corresponding to a different second optical waveguide received and aligned at the second waveguide alignment member, each light redirecting element in the first plurality of light redirecting elements being vertically and horizontally offset from each light redirecting element in the second plurality of light redirecting elements.

In other embodiments, the provided connector further includes a second waveguide alignment member vertically offset from the first waveguide alignment member for receiving and aligning at least one second optical waveguide. The input side of the first light redirecting member can input light from a first optical waveguide disposed and aligned at the first waveguide alignment member at a first location on the input side, and a second optical waveguide disposed and aligned at the second waveguide alignment member at a different second location on the input side, the second location being vertically offset from the first location. The light redirecting side of the first light redirecting member can receive light from the first location on the input side at a first location on the light redirecting side, and the second location on the input side at a different second location on the light redirecting side. The output side of the first light redirecting member can receive light from the first location on the light redirecting side and can transmit the received light as output light from a first location on the output side, and the second location on the light redirecting side and transmits the received light as output light from a different second location on the output side. In some embodiments for the provided connector, the second location on the input side can be vertically offset from the first location on the input side. In some embodiments, the second location on the light redirecting side can be vertically and horizontally offset from the first location on the light redirecting side. In other embodiments, the second location on the output side can be horizontally offset from the first location on the output side. Also provided is a connector that has the light redirecting side of the first light redirecting member including features at at least one of the first and second locations on the light redirecting side so that the output lights from the first and second locations on the output side can be substantially collimated, have a same divergence angle, or have a same convergence angle. The provided connector can feature V-grooves.

In some embodiments, provided connectors can include a housing comprising a first attachment area for receiving and permanently attaching to a plurality of optical waveguides and a light coupling unit disposed in and configured to move within the housing. The light coupling unit can include a second attachment area for receiving and permanently attaching to a plurality of optical waveguides received and permanently attached at the first attachment area and a first waveguide alignment member for receiving and aligning the at least one first optical waveguide. The provided connector can also include a first light redirecting member that includes an input side of the first light redirecting member for receiving input light along an input direction of the first light redirecting member from a first optical waveguide disposed and aligned at the first waveguide alignment member, a light redirecting side of the first light redirecting member for receiving light from the input side of the first light redirecting member along an input direction and redirecting the light along a different redirected direction of the first light redirecting member, and an output side of the first light redirecting member for receiving light from the light redirecting side of the first light redirecting member and transmitting the received light as output light from the first light redirecting member, exiting the first light redirecting member along an output direction of the first light redirecting member toward an input side of a second light redirecting member of a mating connector. The first light redirecting member can have a greater than one refractive index between the input and output side. The light coupling unit can be configured to change a divergence of light from at least one of the plurality of optical waveguides such that the light from the optical waveguide exits the connector along an output direction different than a mating direction of the connector, the connector being configured so that when the connector mates with a mating connector in a mating direction, the light coupling unit rotates in a mating direction causing the optical waveguide to bend. The provided connector can have a second waveguide alignment member vertically offset from the first waveguide alignment member for receiving and aligning at least one second optical waveguide and a second light redirecting member vertically offset from the first light redirecting member. The second light redirecting member can include an input side of the second light redirecting member for receiving second input light from a second optical waveguide disposed and aligned at the second waveguide alignment member, a light redirecting side of the second light redirecting member for receiving light from the input side of the second light redirecting member along the input direction of the second light redirecting member and redirecting the received light along a redirected direction of the second light redirecting member, and an output side of the second light redirecting member for receiving light from the light redirecting side of the second light redirecting member and transmitting the received light as a output light of the second light redirecting member toward an input side of a light redirecting member of a mating connector. The provided connector can also have first and second registration features for mating with registration features of a mating connector along a connector mating direction different than the output direction of the first light redirecting element. The connector can be configured so that when the connector mates with the mating connector, the output side of the second light redirecting member faces the input side of the second light redirecting member of the mating connector.

In some embodiments, the second waveguide alignment member and the second light redirecting member can be vertically offset in a same direction from the first waveguide alignment member and the first light redirecting member. In some embodiments, the provided connector can include the first and second waveguide alignment members, the first and second light redirecting members, and the registration features being a unitary construction. In some embodiments, the provided connector can include a first light block vertically offset from a second light block, so that when the connector is not mated with a mating connector, light exiting the output side of the first light redirecting member is blocked by the first light block and light exiting the output side of the second light redirecting member is blocked by the second light block. In some embodiments, the first waveguide alignment member can include a first plurality of waveguide alignment elements and the second waveguide alignment member can include a second plurality of waveguide alignment elements, each waveguide alignment element in the first plurality of waveguide alignment elements being configured to receive and align a different first optical waveguide, each waveguide alignment element in the second plurality of waveguide alignment elements being configured to receive and align a different second optical waveguide, each waveguide alignment element in the first plurality of waveguide alignment elements being vertically and horizontally offset from each waveguide alignment element in the second plurality of waveguide alignment elements. In some embodiments of the provided connector, the first light redirecting member can include a first plurality of light redirecting elements and the second light redirecting member can include a second plurality of light redirecting elements, each light redirecting element in the first plurality of light redirecting elements corresponding to a different first optical waveguide received and aligned at the first waveguide alignment member, each light redirecting element in the second plurality of light redirecting elements corresponding to a different second optical waveguide received and aligned at the second waveguide alignment member, each light redirecting element in the first plurality of light redirecting elements being vertically and horizontally offset from each light redirecting element in the second plurality of light redirecting elements.

Figure 8:
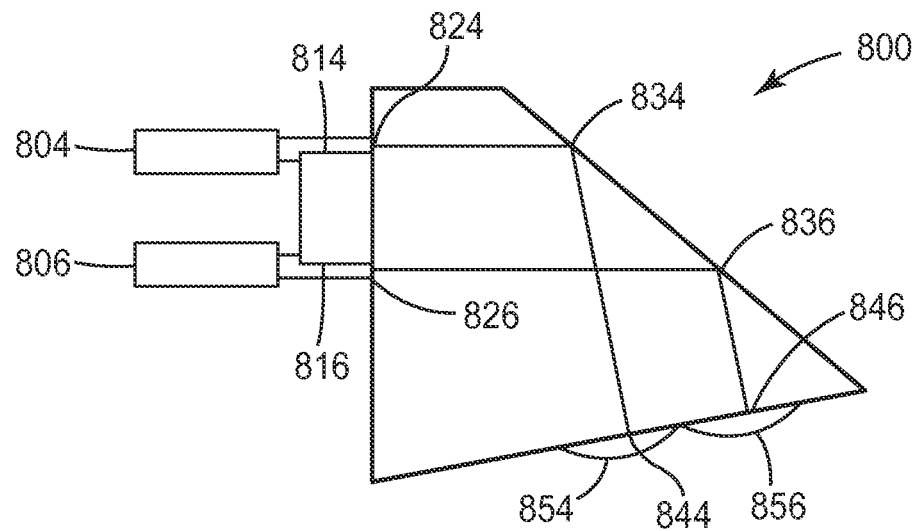
FIG. 8 is an illustration of an exemplary light redirecting member of a provided connector.

FIG. 8 is a drawing of an embodiment of single light redirecting member that can be used in connectors useful for vertically staggered optical waveguide arrays. Light redirecting member 800 has an input side that receives light from first optical waveguide 804 disposed and aligned at first waveguide alignment member 814 at first input location 824 and second optical waveguide 806 disposed and aligned at second waveguide alignment member 816 at second input location 826. Second input location 826 is vertically offset from first input location 824. Light from first optical waveguide 804 and second optical waveguide 806 follow the illustrated paths through light redirecting 800 until they hit first redirecting locations 834 and 836 on the light redirecting side of the single light redirecting member respectively. The light is then reflected to follow different paths so that the light originally from first optical waveguide 804 winds up at first output location 844 and the light originally from second optical waveguide 806 winds up at a second output location 846. Single light redirecting member 800 can include a first optical element with a first curved surface 854 and/or a second optical element with a second curved surface 856 coupled to light from first output location 844 and second output location 846 respectively. The first and second optical elements with first curved surface 854 and second curved surface 856 can focus, collimate, or diverge the light coming from the respective output locations.

Figure 9:
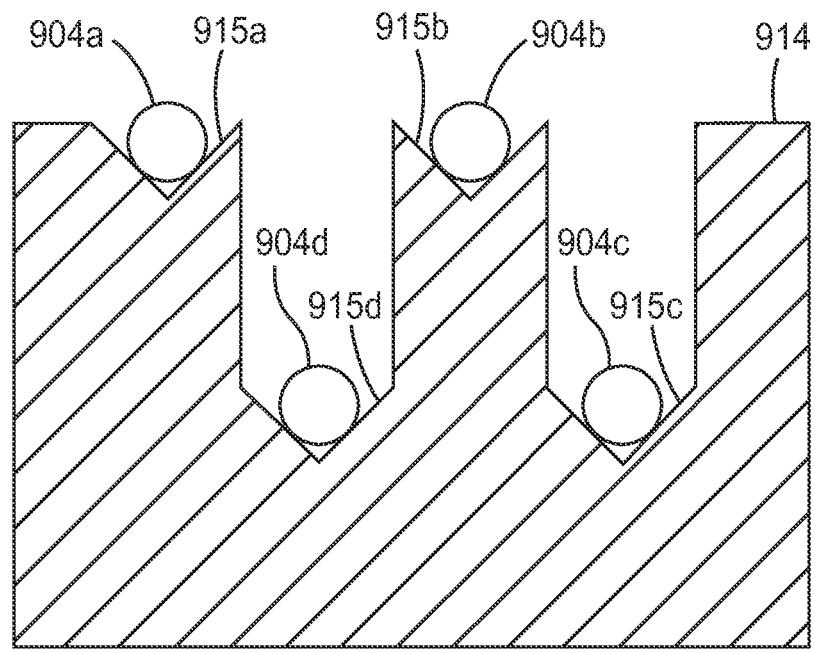
FIG. 9 is an illustration of a cross-section of an embodiment of vertically-staggered optical waveguides at the input face of the light redirecting member.

FIG. 9 is an illustration of a cross-section of an embodiment of vertically-staggered optical waveguides that can utilize a single light redirecting member. In this illustration, four staggered first optical waveguides 904*a-d* are received, aligned, and permanently affixed to first waveguide alignment member 914. First waveguide alignment member 914 as shown has four grooves 915*a-d* for receiving, aligning, and permanently affixing first optical waveguides 604*a-d* respectively. Each first staggered optical waveguide 904*a-d* has a core diameter. In the illustrated embodiment two first staggered optical waveguides 904*a* and 904*b* are vertically (and horizontally) displaced from other optical waveguides 904*c* and 904*d* in a hexagonal closest packing arrangement based upon the maximum beam widths before overlap. It is contemplated that other geometrical arrangements that include vertical stacking are also within the scope of this disclosure.

In some embodiments, a connector is provided that includes a second waveguide alignment member that can be vertically offset from the first waveguide alignment member for receiving and aligning at least one second optical waveguide. In these embodiments, the input side of the first light redirecting member can receive input light from a first optical waveguide disposed and aligned at the first waveguide alignment member at a first location on the input side, and a second optical waveguide disposed and aligned at the second waveguide alignment member at a different second location on the input side, the second location being vertically offset from the first location. The light redirecting side of the first light redirecting member can receive light from the first location on the input side at a first location on the light redirecting side, and the second location on the input side at a different second location on the light redirecting side. The output side of the first light redirecting member can receive light from the first location on the light redirecting side and can transmit the received light as output light from a first location on the output side, and the second location on the light redirecting side and can transmit the received light as output light from a different second location on the output side. In some embodiments, a connector is provided wherein the second location on the input side can be vertically offset from the first location on the input side. In other embodiments, a connector is provided wherein the second location on the light redirecting side can be vertically and horizontally offset from the first location on the light redirecting side. In some embodiments, a connector is provided wherein the second location on the output side can be horizontally offset from the first location on the output side. In some embodiments, a connector is provided wherein the light redirecting side of the first light redirecting member can include features at at least one of the first and second locations on the light redirecting side so that the output lights from the first and second locations on the output side are substantially collimated, have a same divergence angle, or have a same convergence angle. The features can include reflective lenses. In some embodiments, the first and second waveguide alignment members, the first and second light redirecting member and the first and second registration features can be a unitary construction.

In some embodiments, a first light block can be vertically offset from a second light block, so that when the connector is not mated with a mating connector, light exiting the output side of the first light redirecting member can be blocked by the first light block and light exiting the output side of the second light redirecting member can be blocked by the second light block.

In some embodiments where the first waveguide alignment member comprises a first plurality of waveguide alignment elements and the second waveguide alignment member comprises a second plurality of waveguide alignment elements, each waveguide alignment element in the first plurality of waveguide alignment elements can be configured to receive and align a different first optical waveguide, each waveguide alignment element in the second plurality of waveguide alignment elements can be configured to receive and align a different second optical waveguide. Each waveguide alignment element in the first plurality of waveguide alignment elements can be vertically and horizontally offset from each waveguide alignment element in the second plurality of waveguide alignment elements. In some embodiments, each light redirecting element in the first plurality of light redirecting elements can correspond to a different first optical waveguide received and aligned at the first waveguide alignment member and each light redirecting element in the second plurality of light redirecting elements can correspond to a different second optical waveguide received and aligned at the second waveguide alignment member. Each light redirecting element in the first plurality of light redirecting elements can be vertically and horizontally offset from each light redirecting element in the second plurality of light redirecting elements.

In some embodiments, any connector disclosed herein, is configured to mate with a similar connector. In some embodiments, any connector disclosed herein, is hermaphroditic meaning it is configured to mate with itself.

Following are exemplary embodiments of the present disclosure.

Item 1 is a connector comprising:
a housing comprising a first attachment area for receiving and permanently attaching to a plurality of optical waveguides; and
a light coupling unit disposed in and configured to move within the housing and comprising:
a second attachment area for receiving and permanently attaching to a plurality of optical waveguides received and permanently attached at the first attachment area; and
a plurality of curved surfaces, each curved surface corresponding to a different optical waveguide in a plurality of optical waveguides received and permanently attached at the first and second attachment areas, the optical waveguide having a first core diameter, the curved surface being configured to change a divergence of light from the optical waveguide such that light from the optical waveguide exits the connector along an exit direction different than a mating direction of the connector, the exiting light having a second diameter greater than the first core diameter, the connector being configured so that when the connector mates with a mating connector in a mating direction, the light coupling unit rotates causing the optical waveguide to bend.

Item 2 is the connector of item 1, wherein an optical waveguide received and permanently attached to the first and second attachment areas is bent between the two attachment areas, and wherein when the connector mates with a mating connector, the light coupling unit rotates causing the optical waveguide to further bend.

Item 3 is the connector of item 1, wherein the light coupling unit rotates about an axis that changes position as the light coupling unit rotates.

Item 4 is the connector of item 1, wherein when the light coupling unit rotates, it also moves linearly.

Item 5 is the connector of item 1 being configured so that when the connector mates with the mating connector, the light coupling unit rotates about an axis that does not tilt during rotation.

Item 6 is the connector of item 1, wherein light from the optical waveguide exits the light coupling unit in an exit direction different than the connector mating direction.

Item 7 is the connector of item 1, wherein the first attachment area defines a plurality of through holes, each through hole being configured to accommodate a different optical waveguide in a plurality of optical waveguides received at the first attachment area, the optical waveguide being attached to the first attachment area at the through hole.

Item 8 is the connector of item 1, wherein the first attachment area comprises a plurality of grooves, each groove being configured to accommodate a different optical waveguide in a plurality of optical waveguides received at the first attachment area, the optical waveguide being attached to the first attachment area at the groove.

Item 9 is the connector of item 1, wherein the first attachment area comprises one or more alignment features for receiving and permanently attaching to a plurality of optical waveguides integrated onto a common substrate.

Item 10 is the connector of item 1, wherein the first attachment area permanently attaches to a plurality of optical waveguides via an adhesive.

Item 11 is the connector of item 1, wherein the second attachment area comprises a plurality of grooves, each groove being configured to accommodate a different optical waveguide in a plurality of optical waveguides received and permanently attached to at the first attachment area, the optical waveguide being attached to the second attachment area at the groove.

Item 12 is the connector of item 1, wherein the second attachment area comprises a plurality of through holes, each through hole being configured to accommodate a different optical waveguide in a plurality of optical waveguides received and permanently attached to at the first attachment area, the optical waveguide being bonded to the second attachment area at the through hole.

Item 13 is the connector of item 1, wherein the second attachment area comprises one or more alignment features for receiving and permanently attaching a plurality of optical waveguides received and permanently attached to at the first attachment area, the optical waveguides in the plurality of optical waveguides being integrated onto a common substrate.

Item 14 is the connector of item 1, wherein the second attachment area permanently attaches to a plurality of optical waveguides received and permanently attached to at the first attachment area via an adhesive.

Item 15 is the connector of item 1, wherein an optical waveguide permanently attached at the first and second attachment areas is bent between the two attachment areas in a plane formed by the mating direction and the direction of light exiting from the light coupling unit.

Item 16 is the connector of item 1, wherein an optical waveguide permanently attached at the first and second attachment areas is bent between the two attachment areas in a plane perpendicular to the axis around which the optical coupling unit rotates during mating.

Item 17 is the connector of item 1 being configured to receive a plurality of optical waveguides, each optical waveguide comprising an optical fiber.

Item 18 is the connector of item 1, wherein the light coupling unit is a unitary construction.

Item 19 is the connector of item 1, wherein each curved surface in the plurality of curved surfaces comprises a curved mirror.

Item 20 is the connector of item 1, wherein each curved surface in the plurality of curved surfaces comprises a light reflecting lens.

Item 21 is the connector of item 1, wherein each curved surface in the plurality of curved surfaces comprises a light transmitting lens.

Item 22 is the connector of item 1, wherein each curved surface in the plurality of curved surfaces is configured to collimate light from an optical waveguide corresponding to the curved surface.

Item 23 is the connector of item 1, wherein when the connector mates with a mating connector, the light coupling unit rotates at least 0.5 degrees.

Item 24 is the connector of item 1, wherein when the connector mates with a mating connector, the light coupling unit rotates at least 2 degrees.

Item 25 is the connector of item 1, wherein when the connector mates with a mating connector, the light coupling unit rotates at most 90 degrees.

Item 26 is the connector of item 1, wherein an optical waveguide permanently attached at the first and second attachment areas is bent between the two attachment areas in a plane perpendicular to a moving axis around which the optical coupling unit rotates during mating.

Item 27 is the connector of item 1, wherein a ratio of the second diameter to the first core diameter is at least 2.

Item 28 is the connector of item 1, wherein a ratio of the second diameter to the first core diameter is at least 3.7.

Item 29 is the connector of item 1, wherein a ratio of the second diameter to the first core diameter is at least 6.

Item 30 is the connector of item 1 being configured so that when the connector mates with a mating connector, the light coupling unit rotates within the housing by making contact with a corresponding light coupling unit of the mating connector.

Item 31 is the connector of item 30, wherein when the light coupling unit rotates, the corresponding light coupling unit of the mating connector does not move.

Item 32 is the connector of item 30, wherein when the light coupling unit rotates, the corresponding light coupling unit of the mating connector also rotates.

Item 33 is the connector of item 1, wherein when the connector mates with a mating connector, segments of the optical waveguides of the two connectors which are attached to the respective second attachment areas of the optical coupling units lie in a same plane.

Item 34 is the connector of item 33, wherein when the connector having a first plurality of optical waveguides attached to a first light coupling unit mates with a mating connector having a second plurality of optical waveguides attached to a second light coupling unit, the segments of the first and second pluralities of optical waveguides attached to the first and second coupling units lie in a same plane.

Item 35 is the connector of item 33, wherein when the connector having a first plurality of optical waveguides attached to a first light coupling unit mates with a mating connector having a second plurality of optical waveguides attached to a second light coupling unit, the segments of the first plurality of optical waveguides attached to the first light coupling unit lie in a first plane and the segments of the second plurality of optical waveguides attached to the second light coupling unit lie in a second plane that is parallel to and offset from the first plane.

Item 36 is the connector of item 1, wherein the second attachment area is disposed between the first attachment area and the plurality of curved surfaces.

Item 37 is the connector of item 1, wherein when an optical waveguide is received and permanently attached at the first and second attachment areas, the optical waveguide is under a first bending force and when the connector mates with a mating connector, the optical waveguide is under a second bending force greater than the first bending force.

Item 38 is the connector of item 37, wherein the first bending force is substantially zero.

Item 39 is the connector of item 37, wherein the second bending force maintains the mating between the connector and the mating connector.

Item 40 is the connector of item 1, wherein the light coupling unit further comprises a light redirecting member comprising:

an input side for receiving input light from an optical waveguide received and permanently attached at the first and second attachment areas;

a light redirecting side for receiving light from the input side of the light redirecting member in an input direction and redirecting the received light in a different redirected direction; and an output side for receiving light from the light redirecting side and transmitting the received light as output light in an output direction.

Item 41 is the connector of item 40, wherein the light redirecting member has an index of refraction greater than one between the input and output sides.

Item 42 is the connector of item 40, wherein each curved surface in the plurality of curved surfaces is disposed on the input side, the light redirecting side, or the output side of the light redirecting member.

Item 43 is the connector of item 40, wherein the light redirecting member and the plurality of curved surfaces form a unitary construction.

Item 44 is the connector of item 40, wherein the light coupling unit is a unitary construction.

Item 45 is the connector of item 40, wherein the input direction is different from the mating direction.

Item 46 is the connector of item 40, wherein the redirected direction is different from the mating direction.

Item 47 is the connector of item 40, wherein the output direction is different from the mating direction.

Item 48 is the connector of item 40 being configured so that the input side receives input light from a first optical waveguide received and permanently attached at the first and second attachment areas at a first location on the input side and receives input light from a second optical waveguide received and permanently attached at the first and second attachment areas at a second location on the input side vertically offset from the first location, the light redirecting side receives light from the first location on the input side at a first location on the light redirecting side and receives light from the second location on the input side at a second location on the light redirecting side vertically and horizontally offset from the first location on the light redirecting side, and the output side receives light from the first location on the light redirecting side and transmits the received light as output light from a first location on the output side and receives light from the second location on the light redirecting side and transmits the received light as output light from a second location on the output side horizontally offset from the first location on the output side.

Item 49 is the connector of item 40, wherein the output side comprises an anti-reflection coating disposed thereon.

Item 50 is the connector of item 40, wherein the light redirecting member redirects light by total internal reflection.

Item 51 is a cable assembly comprising:
the connector of item 40; and
a plurality of optical waveguides received and permanently attached to the first and second attachment areas.

Item 52 is the cable assembly of item 51, wherein an index matching material optically couples at least one optical waveguide in the plurality of optical waveguides to the input side of the light redirecting member.

Item 53 is the connector of item 1, wherein the housing further includes:
a first support for bending an optical waveguide received and permanently attached at the first and second attachment areas, such that when the connector mates with a mating connector, the optical waveguide further bends causing the optical waveguide to move away from the first support.

Item 54 is the connector of item 53, further comprising a second support disposed between the first attachment area and the first support for supporting, but not being permanently attached to, an optical waveguide received and permanently attached to at the first and second attachment areas.

Item 55 is the connector of item 53, wherein as the connector mates with a mating connector, the optical waveguide first undergoes a first additional bend resulting in the optical waveguide separating from the second support and then a second additional bend resulting in the optical waveguide separating from the first support.

Item 56 is the connector of item 1, wherein the light coupling unit further comprises a tongue portion having a tapering width along at least a portion of a length of the tongue portion and extending outwardly from the light coupling unit, such that when the connector moves toward the mating connector, the tongue portion is guided in a corresponding tongue recess of the mating connector in such a way that a misalignment between the two connectors is corrected.

Item 57 is the connector of item 56, wherein when the connector moves toward the mating connector, the tongue portion is guided in the tongue recess of the mating connector in such a way that a lateral misalignment between the two connectors is corrected.

Item 58 is the connector of item 56, wherein when the connector moves toward the mating connector, a first contact between the connector and the mating connector is between the tongue portion of the connector and the tongue recess of the mating connector.

Item 59 is the connector of item 1 being configured to mate with another connector of item 1.

Item 60 is the connector of item 1 being hermaphroditic.

Item 61 is a connector comprising:
a housing comprising an input attachment area for receiving and permanently attaching to a plurality of optical waveguides;
a lower light coupling unit disposed in and configured to move within the housing and comprising:
   a lower attachment area for receiving and permanently attaching to a plurality of optical waveguides received and permanently attached at the input attachment area; and
   a plurality of lower curved surfaces, each lower curved surface corresponding to a different optical waveguide in a plurality of optical waveguides received and permanently attached at the lower attachment area; and
an upper light coupling unit disposed in the housing vertically offset from the lower light coupling unit and configured to move within the housing and comprising:
   an upper attachment area for receiving and permanently attaching to a plurality of optical waveguides received and permanently attached at the input attachment area; and
   a plurality of upper curved surfaces, each upper curved surface corresponding to a different optical waveguide in a plurality of optical waveguides received and permanently attached at the upper attachment area, each curved surface in the pluralities of lower and upper curved surfaces being configured to change a divergence of light from the optical waveguide corresponding to the curved surface, the optical waveguide having a first core diameter, such that light from the optical waveguide exits the connector along an exit direction different than a mating direction of the connector, the exiting light having a second diameter greater than the first core diameter, the connector being configured so that when the connector mates with a mating connector in a mating direction, each of the lower and upper light coupling units rotates causing any optical waveguide received and permanently attached at the input attachment area and the lower or upper attachment area to bend.

Item 62 is the connector of item 61, wherein the input attachment area comprises:
   a lower input attachment area corresponding to the lower attachment area of the lower light coupling unit, the connector being configured so that when an optical waveguide is received and permanently attached to at the lower input attachment area, the optical waveguide is also received and permanently attached to at the lower attachment area of the lower light coupling unit; and
   an upper input attachment area corresponding to the upper attachment area of the upper light coupling unit, the connector being configured so that when an optical waveguide is received and permanently attached to at the upper input attachment area, the optical waveguide is also received and permanently attached to at the upper attachment area of the upper light coupling unit.

Item 63 is a cable assembly comprising:
the connector of item 62;
a lower plurality of optical waveguides received and attached at the lower input attachment area and the lower attachment area of the lower light coupling unit; and
an upper plurality of optical waveguides received and attached at the upper input attachment area and the upper attachment area of the upper light coupling unit, the cable assembly being configured so that when the connector mates with a mating connector in a mating direction, each of the lower and upper light coupling units rotates causing each optical waveguide in the lower and upper pluralities of optical waveguides to bend.

Item 64 is the connector of item 61, wherein the lower light coupling units further comprises: a lower light redirecting member comprising:
   an input side for receiving input light from an optical waveguide received and permanently attached at the input and lower attachment areas;
   a light redirecting side for receiving light from the input side of the light redirecting member in an input direction and redirecting the received light in a different redirected direction; and
   an output side for receiving light from the light redirecting side and transmitting the received light as output light in an output direction; and
an upper light redirecting member vertically offset from the lower light redirecting member and comprising:
   an input side for receiving input light from an optical waveguide received and permanently attached at the input and upper attachment areas;
   a light redirecting side for receiving light from the input side of the light redirecting member in an input direction and redirecting the received light in a different redirected direction; and
   an output side for receiving light from the light redirecting side and transmitting the received light as output light in an output direction.

Item 65 is the connector of item 61, wherein each of the lower and upper light coupling units is a unitary construction.

Item 66 is the connector of item 61, wherein the lower light coupling unit further comprises a lower light block and the upper light coupling unit further comprises an upper light block, such that when the connector is not mated with a mating connector, the lower light block blocks light exiting the connector from the lower light coupling unit and the upper light block blocks light exiting the connector from the upper light coupling unit.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A connector comprising:
   a housing comprising a first attachment area for receiving and permanently attaching to a plurality of optical waveguides; and
   a light coupling unit disposed in and configured to move within the housing and comprising:
      a second attachment area for receiving and permanently attaching to a plurality of optical waveguides received and permanently attached at the first attachment area; and a plurality of curved surfaces, each curved surface corresponding to a different optical waveguide in a plurality of optical waveguides received and permanently attached at the first and second attachment areas, the optical waveguide having a first core diameter, the curved surface being configured to change a divergence of light from the optical waveguide such that light from the optical waveguide exits the connector along an exit direction different than a mating direction of the connector, the exiting light having a second diameter greater than the first core diameter, the connector being configured so that when the connector mates with a mating connector in a mating direction, the light coupling unit rotates causing the optical waveguide to bend.

2. The connector of claim 1, wherein an optical waveguide received and permanently attached to the first and second attachment areas is bent between the two attachment areas, and wherein when the connector mates with a mating connector, the light coupling unit rotates causing the optical waveguide to further bend.

3. The connector of claim 1, wherein the light coupling unit rotates about an axis that changes position as the light coupling unit rotates.

4. The connector of claim 1, wherein when the light coupling unit rotates, it also moves linearly.

5. The connector of claim 1 being configured so that when the connector mates with the mating connector, the light coupling unit rotates about an axis that does not tilt during rotation.

6. The connector of claim 1, wherein the first attachment area comprises a plurality of grooves, each groove being configured to accommodate a different optical waveguide in a plurality of optical waveguides received at the first attachment area, the optical waveguide being attached to the first attachment area at the groove.

7. The connector of claim 1, wherein the second attachment area comprises a plurality of grooves, each groove being configured to accommodate a different optical waveguide in a plurality of optical waveguides received and permanently attached to at the first attachment area, the optical waveguide being attached to the second attachment area at the groove.

8. The connector of claim 1, wherein an optical waveguide permanently attached at the first and second attachment areas is bent between the two attachment areas in a plane formed by the mating direction and the direction of light exiting from the light coupling unit.

9. The connector of claim 1, wherein an optical waveguide permanently attached at the first and second attachment areas is bent between the two attachment areas in a plane perpendicular to the axis around which the optical coupling unit rotates during mating.

10. The connector of claim 1, wherein the light coupling unit is a unitary construction.

11. The connector of claim 1, wherein when the connector mates with a mating connector, the light coupling unit rotates at least 2 degrees.

12. The connector of claim 1, wherein an optical waveguide permanently attached at the first and second attachment areas is bent between the two attachment areas in a plane perpendicular to a moving axis around which the optical coupling unit rotates during mating.

13. The connector of claim 1, wherein a ratio of the second diameter to the first core diameter is at least 6.

14. The connector of claim 1 being configured so that when the connector mates with a mating connector, the light coupling unit rotates within the housing by making contact with a corresponding light coupling unit of the mating connector.

15. The connector of claim 14, wherein when the light coupling unit rotates, the corresponding light coupling unit of the mating connector does not move.

16. The connector of claim 14, wherein when the light coupling unit rotates, the corresponding light coupling unit of the mating connector also rotates.

17. The connector of claim 1, wherein when the connector mates with a mating connector, segments of the optical waveguides of the two connectors which are attached to the respective second attachment areas of the optical coupling units lie in a same plane.

18. The connector of claim 1, wherein when an optical waveguide is received and permanently attached at the first and second attachment areas, the optical waveguide is under a first bending force and when the connector mates with a mating connector, the optical waveguide is under a second bending force greater than the first bending force.

19. The connector of claim 18, wherein the second bending force maintains the mating between the connector and the mating connector.

20. The connector of claim 1, wherein the light coupling unit further comprises a light redirecting member comprising:
   an input side for receiving input light from an optical waveguide received and permanently attached at the first and second attachment areas;
   a light redirecting side for receiving light from the input side of the light redirecting member in an input direction and redirecting the received light in a different redirected direction; and
   an output side for receiving light from the light redirecting side and transmitting the received light as output light in an output direction.

21. The connector of claim 20 being configured so that the input side receives input light from a first optical waveguide received and permanently attached at the first and second attachment areas at a first location on the input side and receives input light from a second optical waveguide received and permanently attached at the first and second attachment areas at a second location on the input side vertically offset from the first location, the light redirecting side receives light from the first location on the input side at a first location on the light redirecting side and receives light from the second location on the input side at a second location on the light redirecting side vertically and horizontally offset from the first location on the light redirecting side, and the output side receives light from the first location on the light redirecting side and transmits the received light as output light from a first location on the output side and receives light from the second location on the light redirecting side and transmits the received light as output light from a second location on the output side horizontally offset from the first location on the output side.

22. A connector comprising:
   a housing comprising an input attachment area for receiving and permanently attaching to a plurality of optical waveguides;
   a lower light coupling unit disposed in and configured to move within the housing and comprising:
      a lower attachment area for receiving and permanently attaching to a plurality of optical waveguides received and permanently attached at the input attachment area; and a plurality of lower curved surfaces, each lower curved surface corresponding to a different optical waveguide in a plurality of optical waveguides received and permanently attached at the lower attachment area; and an upper light coupling unit disposed in the housing vertically offset from the lower light coupling unit and configured to move within the housing and comprising:

an upper attachment area for receiving and permanently attaching to a plurality of optical waveguides received and permanently attached at the input attachment area; and a plurality of upper curved surfaces, each upper curved surface corresponding to a different optical waveguide in a plurality of optical waveguides received and permanently attached at the upper attachment area, each curved surface in the pluralities of lower and upper curved surfaces being configured to change a divergence of light from the optical waveguide corresponding to the curved surface, the optical waveguide having a first core diameter, such that light from the optical waveguide exits the connector along an exit direction different than a mating direction of the connector, the exiting light having a second diameter greater than the first core diameter, the connector being configured so that when the connector mates with a mating connector in a mating direction, each of the lower and upper light coupling units rotates causing any optical waveguide received and permanently attached at the input attachment area and the lower or upper attachment area to bend.

23. The connector of claim 22, wherein the input attachment area comprises:

a lower input attachment area corresponding to the lower attachment area of the lower light coupling unit, the connector being configured so that when an optical waveguide is received and permanently attached to at the lower input attachment area, the optical waveguide is also received and permanently attached to at the lower attachment area of the lower light coupling unit; and an upper input attachment area corresponding to the upper attachment area of the upper light coupling unit, the connector being configured so that when an optical waveguide is received and permanently attached to at the upper input attachment area, the optical waveguide is also received and permanently attached to at the upper attachment area of the upper light coupling unit.

24. A cable assembly comprising:
the connector of claim 22;
a lower plurality of optical waveguides received and attached at the lower input attachment area and the lower attachment area of the lower light coupling unit; and an upper plurality of optical waveguides received and attached at the upper input attachment area and the upper attachment area of the upper light coupling unit, the cable assembly being configured so that when the connector mates with a mating connector in a mating direction, each of the lower and upper light coupling units rotates causing each optical waveguide in the lower and upper pluralities of optical waveguides to bend.

25. The connector of claim 22, wherein the lower light coupling units further comprises:

a lower light redirecting member comprising:

an input side for receiving input light from an optical waveguide received and permanently attached at the input and lower attachment areas;

a light redirecting side for receiving light from the input side of the light redirecting member in an input direction and redirecting the received light in a different redirected direction; and an output side for receiving light from the light redirecting side and transmitting the received light as output light in an output direction; and an upper light redirecting member vertically offset from the lower light redirecting member and comprising:

an input side for receiving input light from an optical waveguide received and permanently attached at the input and upper attachment areas;

a light redirecting side for receiving light from the input side of the light redirecting member in an input direction and redirecting the received light in a different redirected direction; and an output side for receiving light from the light redirecting side and transmitting the received light as output light in an output direction.

26. The connector of claim 22, wherein the lower light coupling unit further comprises a lower light block and the upper light coupling unit further comprises an upper light block, such that when the connector is not mated with a mating connector, the lower light block blocks light exiting the connector from the lower light coupling unit and the upper light block blocks light exiting the connector from the upper light coupling unit.

* * * * *